United States Patent [19]

Nedbal et al.

[11] Patent Number: 5,437,491
[45] Date of Patent: Aug. 1, 1995

[54] FUEL DOOR HOUSING

[75] Inventors: Ralph G. Nedbal, Orland Park; John F. Nelson, New Lenox, both of Ill.

[73] Assignee: Illinois Tool Works Inc., Glenview, Ill.

[21] Appl. No.: 224,511

[22] Filed: Apr. 7, 1994

[51] Int. Cl.6 .............................................. B60K 15/05
[52] U.S. Cl. ................................ 296/97.22; 220/86.2
[58] Field of Search ............................ 296/97.22, 208; 220/86.2, DIG. 33; 280/834

[56] References Cited

U.S. PATENT DOCUMENTS

| | | |
|---|---|---|
| 2,760,811 | 8/1956 | Basferd . |
| 3,334,779 | 8/1967 | Smith ................... 220/86.2 |
| 4,099,645 | 7/1978 | Muth et al. ............... 220/304 |
| 4,376,542 | 3/1983 | Hennessy ................ 277/189 |
| 4,509,567 | 4/1985 | Harrison et al. ............ 141/97 |
| 4,653,660 | 3/1987 | Shaw . |
| 4,782,978 | 11/1988 | Appleby et al. ...... 220/DIG. 33 X |
| 4,784,423 | 11/1988 | Pardy ................ 296/97.22 |
| 4,811,984 | 3/1989 | Hempl ............... 296/97.22 |
| 4,866,182 | 12/1989 | Fedelem et al. . |
| 4,917,418 | 4/1990 | Gokee ................. 292/125 |
| 4,971,382 | 11/1990 | Ohno ................ 296/97.22 |
| 5,044,678 | 9/1991 | Detweiler ............ 296/97.22 X |
| 5,090,760 | 2/1992 | Wheeler .............. 296/1.1 |
| 5,118,155 | 6/1992 | Koop ................. 296/1.1 |
| 5,165,749 | 11/1992 | Sheppard ............. 296/97.22 |

FOREIGN PATENT DOCUMENTS

| | | | |
|---|---|---|---|
| 151430 | 9/1982 | Japan ................. 296/97.22 |
| 47726 | 3/1985 | Japan ................. 280/834 |
| 437395 | 10/1935 | United Kingdom ........ 220/86.2 |

Primary Examiner—Dennis H. Pedder
Attorney, Agent, or Firm—Schwartz & Weinrieb

[57] ABSTRACT

A fuel door housing for readily attaching a neck of a fuel tank with respect to an aperture or recess pocket in a sheet metal or non-metallic body panel of a vehicle includes a hollow sleeve having a cross-sectional dimension less than the aperture, and has first and second ends. The first end extends a predetermined distance away from the aperture within the interior of the body panel for connection with the fuel tank neck, and the second end extends a slight distance through the aperture to the exterior of the body panel. A flange having a predetermined configuration is connected to the second end of the sleeve and is substantially positioned on the exterior of the body panel. The flange is configured to connect and center the sleeve with respect to the aperture and provide a degree of flexibility to the flange for readily adjusting the flange and the housing with respect to the aperture upon installation as well as adjusting to movement between the housing and the body panel that may occur during use.

18 Claims, 5 Drawing Sheets

FUEL DOOR HOUSING

BACKGROUND OF THE INVENTION

1. Field of the Invention

This invention relates generally to vehicle fuel door housings, and more particularly, to a fuel door housing for connection to a sheet metal or nonmetallic panel, such as a body panel of an automobile, which readily attaches a fuel tank neck to the body panel, centers the housing with respect to the recess pocket in the body panel and is adjustable for accommodating movement between the housing and the body panel that may occur during use.

2. Description of the Related Art

To provide fuel into a fuel tank of a vehicle, the tank typically includes a neck portion which extends outwardly away from the tank toward an exterior body panel of the vehicle, such as an automobile, truck or the like. The body panel is typically made of sheet metal or the like and includes an aperture therethrough which provides access to the neck by a user from the exterior of the vehicle.

The body panel typically includes a door member hingedly connected thereto which is opened by a user to provide access to a fuel cap provided on the end of the neck. The fuel cap is removed at a filling station to enable a fuel nozzle to be inserted within the neck and the fuel tank to be filled.

In order stabilize the neck with respect to the aperture, some type of flange is typically provided between the neck and the body panel about the aperture. The flange is typically rigidly connected to the neck and body panel by means of a fastener, by welding or any similar method. Alternatively, the body panel can be integrally formed or stamped with the flange which in turn is connected to the neck as described above.

During assembly, care must be taken to ensure that the neck is positioned with respect to the aperture of the body panel. This can be difficult, especially when the connection is done on an assembly line with a partially assembled vehicle.

Additionally, during use, the body panel, flange and neck can be exposed to a variety of forces which could cause movement between the components and cause the connection between these components to weaken and possibly fail. Such forces can be provided by the normal movement and vibrations associated with the vehicle or from temperature differentials. Such temperature differentials expand and contract the components at the same or different rates, depending on the materials, and can cause weakening or failure of the connections therebetween.

It therefore would be desirable to provide a fuel door housing which readily connects a neck of a fuel tank with respect to an aperture or recess pocket in a body panel, ensures centering of the door within the recess pocket and accommodates movement between the associated components that may occur during use.

SUMMARY OF THE INVENTION

The present invention provides a fuel door housing for readily attaching a neck of a fuel tank with respect to an aperture or recess pocket in a body panel of a vehicle. The housing includes a hollow sleeve having a cross-sectional dimension less than the aperture and first and second ends. The first end extends a predetermined distance away from the aperture within the interior of the body panel for connection with the fuel tank neck. The second end extends a slight distance through the aperture to the exterior of the body panel.

A flange is included with the housing having a predetermined configuration and connected to the second end of the sleeve. The flange is substantially positioned on the exterior of the body panel and is configured to connect the sleeve so that it is substantially centered within the aperture while providing a degree of flexibility to the flange.

The flexibility of the flange enables the housing to readily adjust with respect to the recess pocket upon installation and to adjust to movement between the housing and the body panel that may occur during use. The housing also preferably includes a door hingedly connected thereto for covering the aperture as desired as well as an associated latch mechanism and a dampening mechanism.

The housing and door can also be configured to enable centering of the door with respect to the housing when closed. A tether for a cap which covers the fuel tank neck can also be included with the housing as well as a hook on the door or elsewhere for hanging the tether and cap.

BRIEF DESCRIPTION OF THE DRAWINGS

Various other objects, features, and attendant advantages of the present invention will be more fully appreciated from the following detailed description, when considered in connection with the accompanying drawings, in which like reference characters designate like or corresponding parts throughout the several views, and wherein.

DESCRIPTION OF THE PREFERRED EMBODIMENTS

Figure 1:
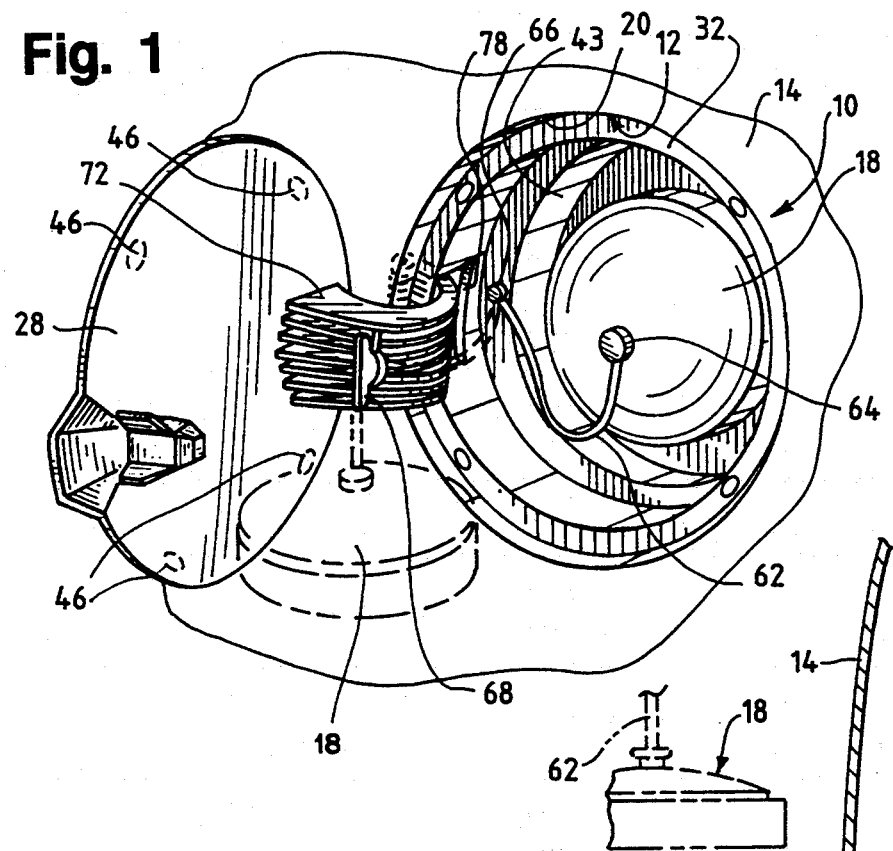
FIG. 1 is a perspective view of a portion of a body panel of a vehicle having a fuel door housing of the invention connected within an aperture or recess pocket defined therein with the door in an open position and illustrating the tether and removed gas cap in dotted lines.
Figure 3:
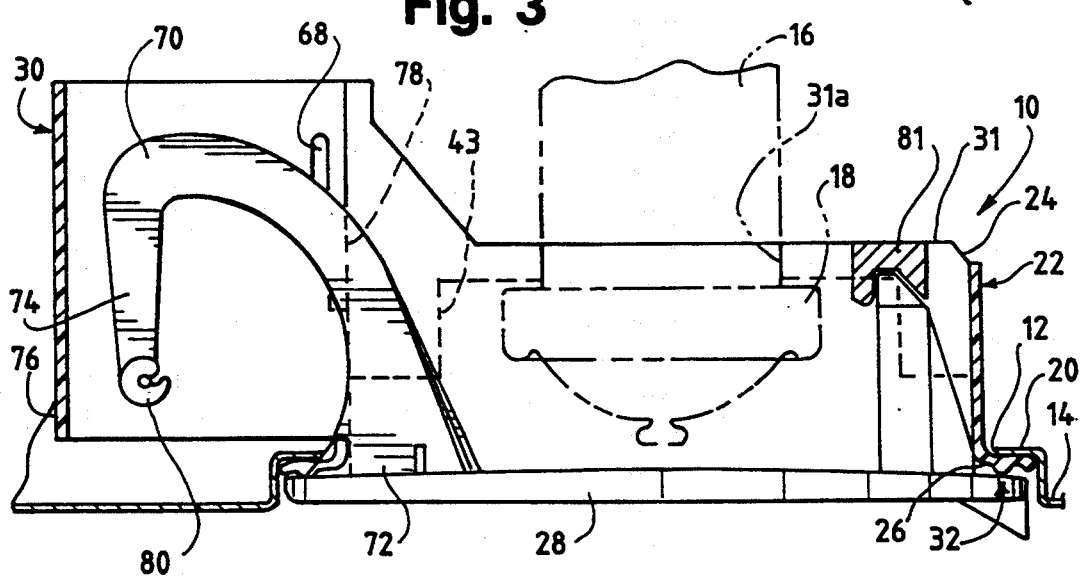
FIG. 3 is a cross-sectional view of a portion of the body panel and the housing of FIG. 1 illustrating the door in a closed position with the gas cap and fuel tank neck illustrated in dotted lines.

Referring to FIGS. 1 and 3, a fuel door housing of the invention is designated generally by the reference numeral 10. The housing 10 is preferably secured within an aperture 12 of a body panel 14 of a vehicle (not illustrated) and secures a fuel tank neck 16 having a cap 18 with respect to the body panel 14.

The body panel 14 preferably is made of sheet metal or the like. In order to provide the housing 10 flush with an exterior surface of the body panel 14, a recess or pocket 20 is preferably integrally formed from the body panel 14 and includes the aperture 12 for accepting the housing 10 therein as described below.

The fuel tank neck 16 is connected on one end with a fuel tank (not illustrated) and on an opposite end with the housing 10. To cover the neck 16 during use, the cap 18 is preferably connected to the neck 16 by threads (not illustrated).

As FIG. 3 illustrates, the housing 10 is preferably made of plastic or any other material and includes a hollow sleeve 22 having first and second opposite ends 24 and 26, a fuel door 28 and a hinge structure 30 for the fuel door 28. The sleeve 22 is preferably circular in shape, but can vary so long as it functions as described herein.

The first end 24 of the sleeve 22 extends into the interior of the body panel 14 and is closed off with a circular bottom surface 31 having an aperture 31a therethrough. The neck 16 extends through the aperture 31a and, if desired, can be connected within the aperture in any desired way so long as access to the fuel neck 16 is provided.

The second end 26 terminates proximate a position just outside the aperture 12 and includes a flange 32 which extends about the sleeve 22 on the exterior of the body panel 14 within the recess 20.

Figure 4:
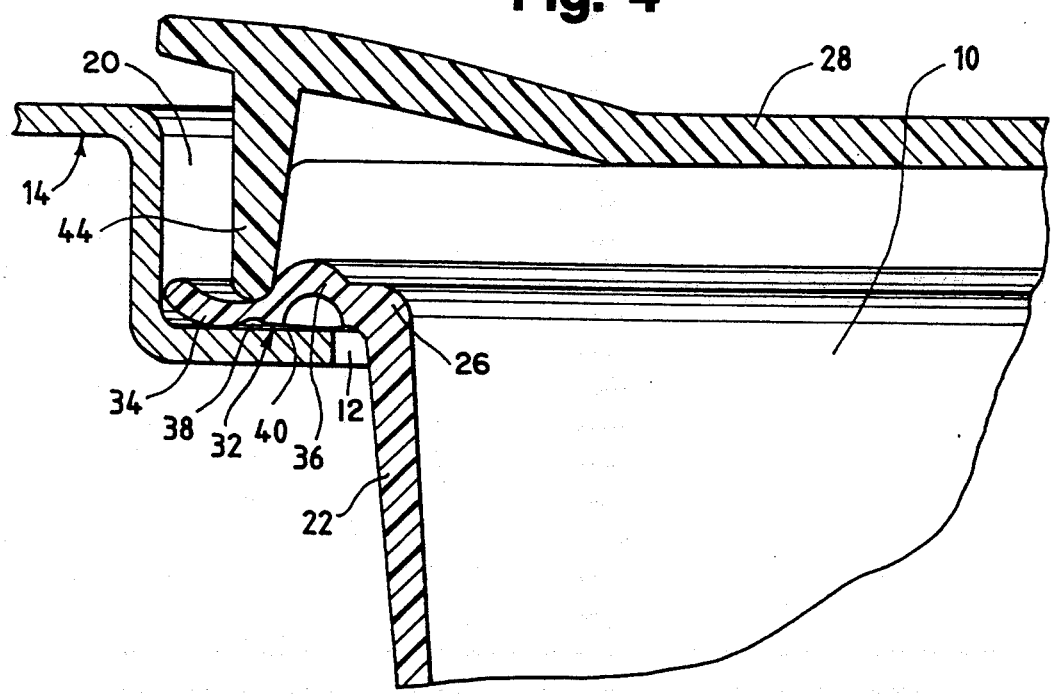
FIG. 4 is an enlarged cross-sectional view of a portion of the body panel, housing and an embodiment of the housing flange of the invention illustrating engagement therebetween.

As FIG. 4 illustrates, the flange 32 preferably has a predetermined cross-sectional shape generally described as a "duck bill" having a lip or bill portion 34 and a bead or head portion 36. To provide a degree of flexibility to the lip 34, a recess 38 is included which enables the lip 34 to flex upon engagement with the body panel 14.

The flexibility of the lip 34 provides self-centering of the housing 10 with respect to the body panel 14 and further allows for self-adjustment or movement between the housing 10 and the body panel 14 during use to reduce the risk of failure of these components. Such adjustment may be necessary if movement between the housing 10 and body panel 14 occurs, such as from changes in temperature or vibrations of the vehicle.

The bead 36 on the flange 32 adds strength and stability to the flange 32 and provides a ring for centering of the fuel door 28 as described herein. The bead 36 can be hollow as illustrated in the embodiment of FIG. 4 or solid as illustrated in the embodiment of FIG. 5.

Figure 5:
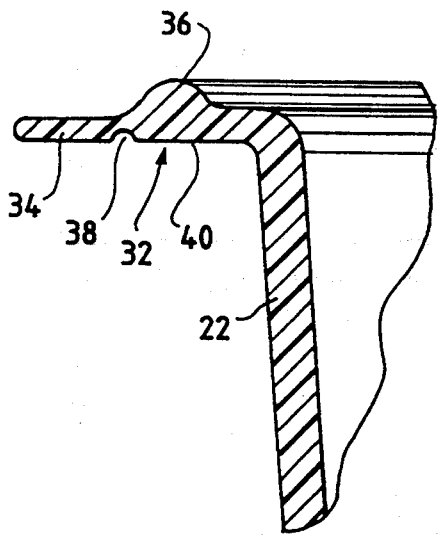
FIG. 5 is an enlarged partial cross-sectional view of another embodiment of the housing flange of the present invention.
Figure 6:
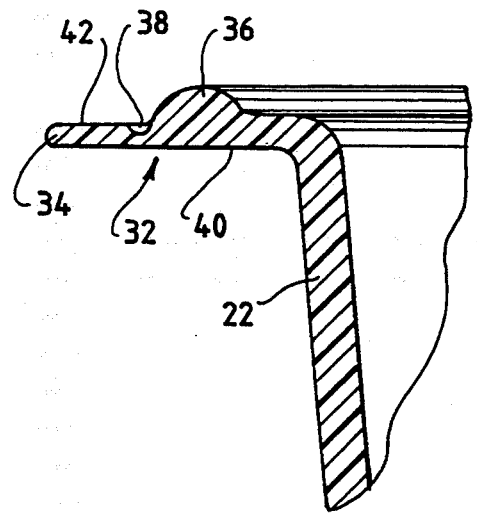
FIG. 6 is an enlarged partial cross-sectional view of yet another embodiment of the housing flange of the present invention.

The recess 38 is preferably provided on a bottom side 40 of the flange 32, as FIGS. 4 and 5 illustrate, or can be provided on a top side 42 of the flange 32 as the embodiment of FIG. 6 illustrates. In either event, the recess 38 provides the desired degree of flexibility for centering and adjusting as described above.

As FIGS. 1 and 3 illustrate, the sleeve 22 preferably is stepped at 43 which assists in strengthening the sleeve 22. It is to be understood, however, that the particular shape of the sleeve 22 can vary.

Figure 7:
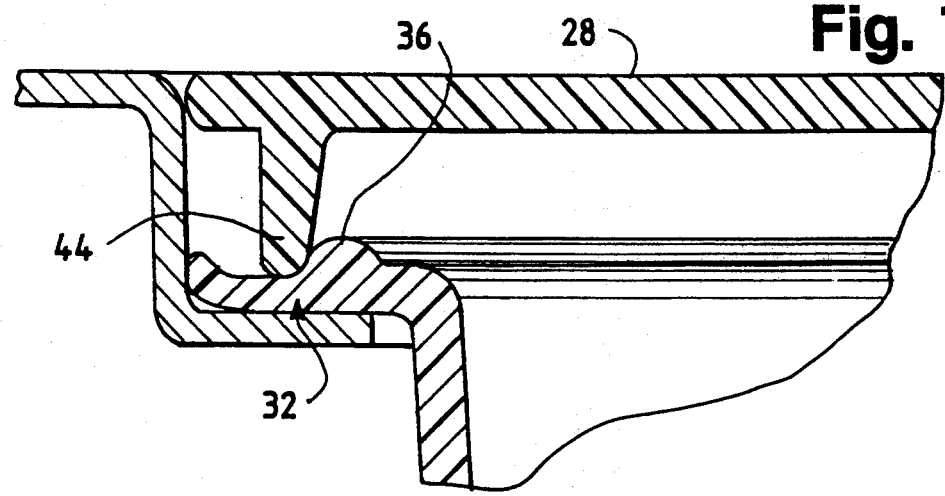
FIG. 7 is an enlarged partial cross-sectional view of the body panel and another embodiment of the flange which provides centering of the door.

As FIGS. 4 and 7 illustrate, the door 28 preferably includes a depending ridge 44 about its periphery which adds strength and stability to the door 28 and self-centers the door 28 with respect to the housing 10. When closed, the ridge 44 of the door 28 is engaged with the bead 36 of the flange 32 so as to provide the desired alignment.

At low temperatures, the door 28 may freeze to the housing 10 preventing filling of the fuel tank. In order to prevent such freezing, the door 28 and housing 10 can be configured in a variety of ways to reduce the contact area between these two members.

Figure 8:
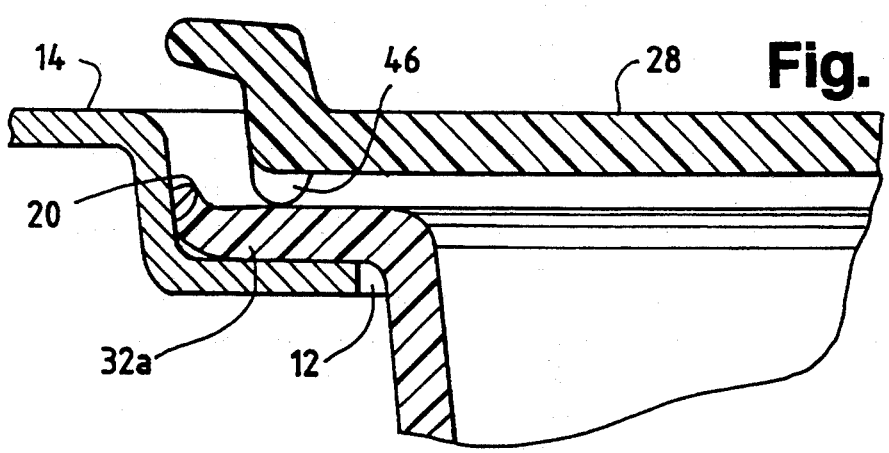
FIG. 8 is an enlarged partial cross-sectional view of the body panel and another embodiment of the flange which provides drainage to prevent the door from freezing closed.

Preferably, as FIGS. 1 and 8 illustrate, the door 28 includes one or more bumps 46, preferably four, positioned at selected locations about the periphery of the door 28. Thus, contact between the door 28 and the housing 10 is reduced to the engagement between the bumps and the housing 10.

Figure 9:
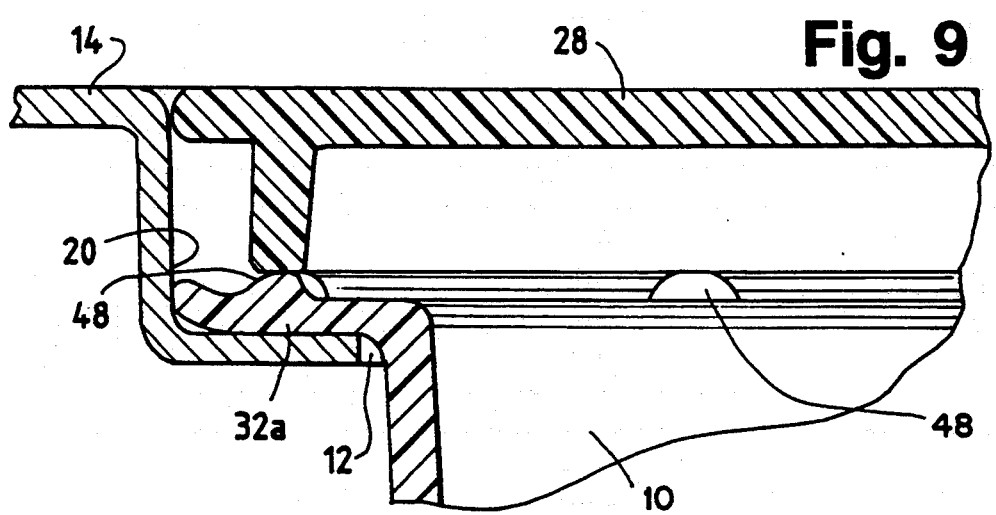
FIG. 9 is an enlarged partial cross-sectional view of the body panel and yet another embodiment of the flange which provides centering of the door.

Alternatively, as FIG. 9 illustrates, bumps 48 can be included on the housing 10 for engagement with the door 28. In either event, the housing 10 can include a flange 32a having a shape other than the flange 32 described above and may or may not include the bead 36 and ridge 44 for centering of the door 28.

Figure 10:
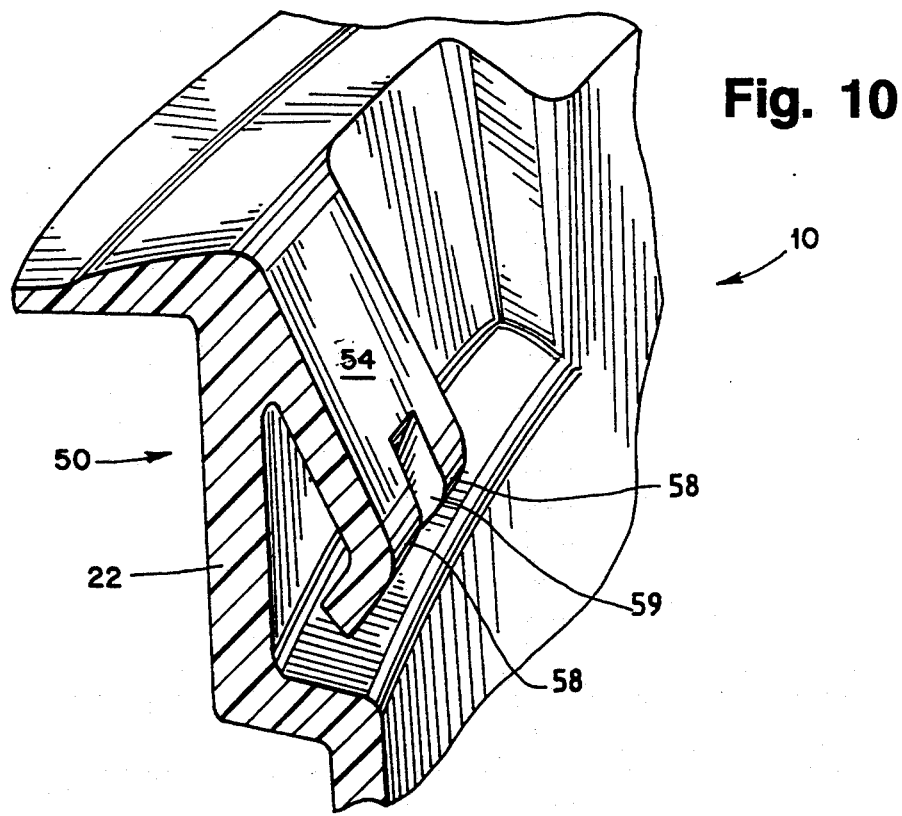
FIG. 10 is an enlarged perspective view, in partial section, of a portion of the housing of the present invention illustrating the flexible latch finger of the housing.
Figure 11:
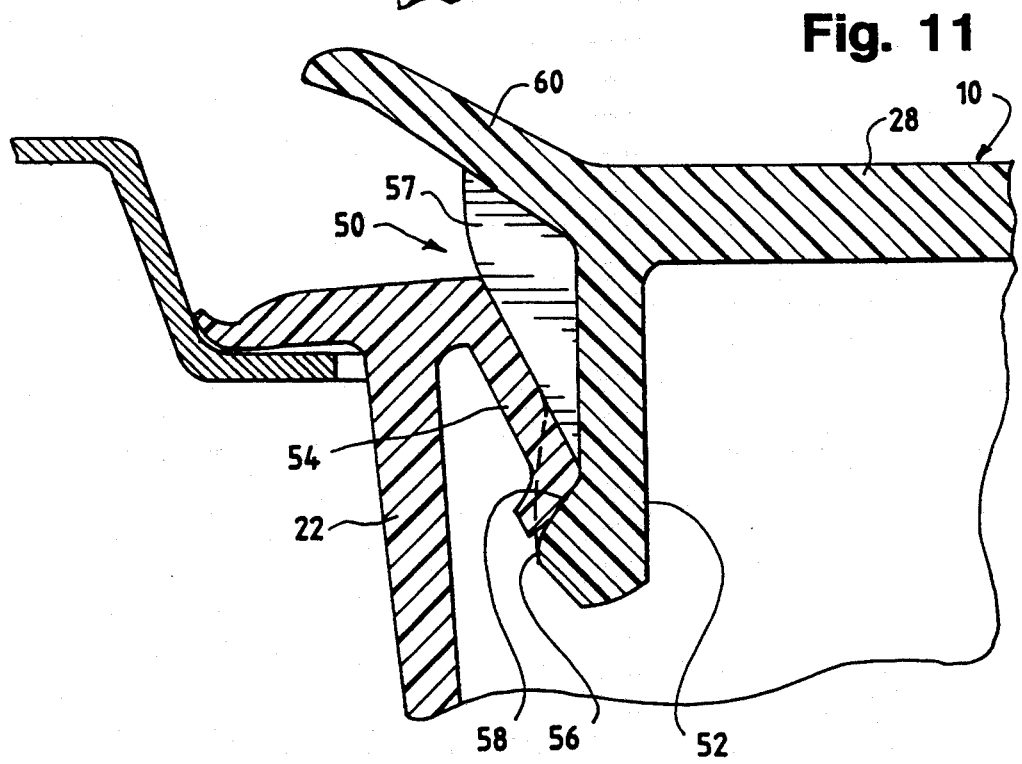
FIG. 11 is an enlarged partial cross-sectional view of the body panel and housing of the present invention illustrating latching between the door and the housing.

As FIGS. 10 and 11 illustrate, to maintain the door 28 in a closed position a latch mechanism 50 between the door 28 and the sleeve 22 of the housing 10 is included. The latch mechanism 50 preferably includes a rigid finger 52 connected to the door 28 for engagement with a flexible finger 54 connected to the sleeve 22.

The rigid finger 52 includes a shoulder 56 on its distal end and a central ridge 57 for cooperative engagement with a pair of flanges 58 formed on the flexible finger 54 with a slot 59 therebetween. Accordingly, upon closing of the door 28 the rigid finger 52 forces the flexible finger 54 toward the sleeve 22 until the flanges 58 seat behind the shoulder 56 with the ridge 57 within the slot 59.

To open the door 28, a handle 60 on the door 28 can be pulled by a user or a remote door opener mechanism (not illustrated) can be activated by a user, typically from the interior of the vehicle. In either event, the flanges 58 disengage from the shoulder 56 to open the door 28.

As FIG. 1 illustrates, the cap 18 is utilized to close the neck 16 after filling of the tank. To reduce the risk of losing the cap 18 during filling of the tank, a tether 62 is connected on one end 64 to the cap 18 and on an opposite end 66 to the housing 10 or neck 16.

When the cap 18 is attached to the neck 16 the tether 62 can be merely coiled within the housing 10 or can be retracted through an aperture (not illustrated) in the housing 10 to the interior of the body panel 14. In order to reduce the risk of scratching the body panel 14 when the cap 18 is removed, the housing 10 preferably includes a hook 68.

Figure 2:
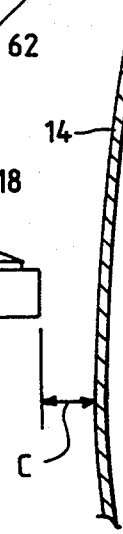
FIG. 2 is a cross-sectional view of a portion of the body panel of FIG. 1 illustrating the hanging of the gas cap by the tether of the invention.
Figure 12:
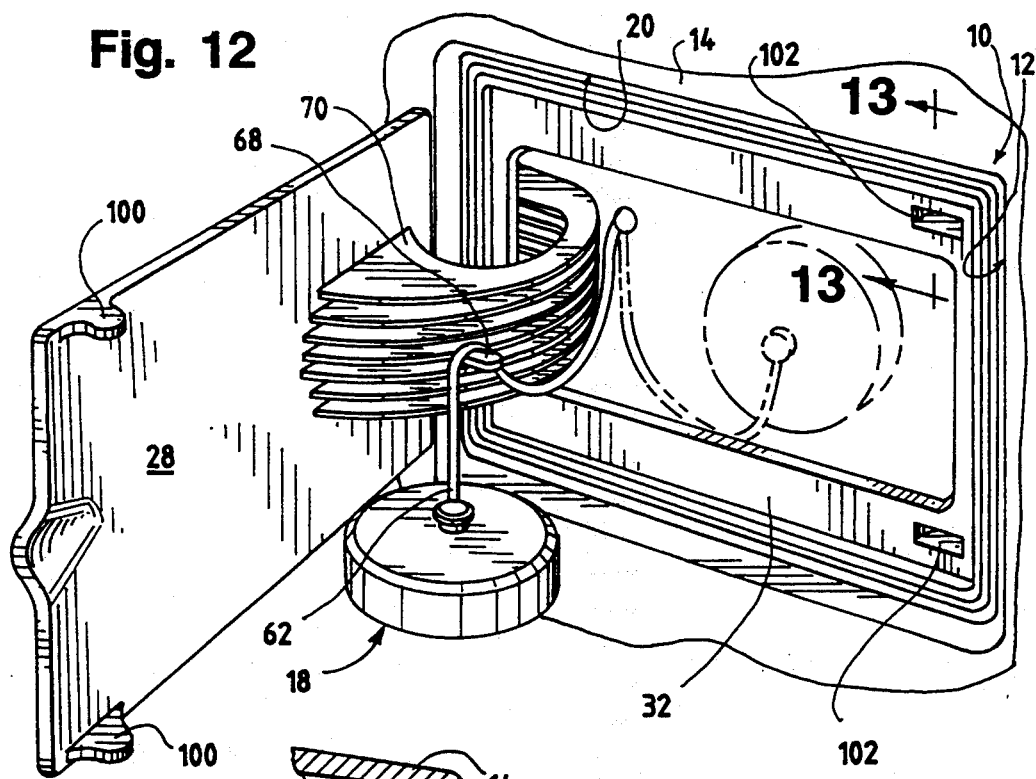
FIG. 12 is a perspective view, similar to FIG. 1, of a portion of a body panel of a vehicle having a fuel door housing of another embodiment of the invention connected within an aperture or recess pocket defined therein with the door in an open position and illustrating the tether and removed gas cap.

The hook 68 is preferably connected to a portion of the hinge structure 30 and enables the tether 62 to be draped over the hook 68 as best seen in FIG. 12. As FIG. 2 illustrates, when the tether 62 is draped over the hook 68 the cap 18 is positioned with a predetermined clearance "C" from the body panel 14.

As FIG. 3 illustrates, the hinge structure 30 includes a hinge member 70 connected at a first end 72 to the door 28 and at a second end 74 to a hinge enclosure 76. The enclosure 76 is connected to the sleeve 22 of the housing 10 and is preferably integrally formed therewith.

The hinge 70 extends through an aperture or slot 78 in the sleeve 22 and is protected within the interior of the body panel 14 by the enclosure 76. Typically, to assist in closing the door 28, an overcenter spring (not illustrated) is provided.

Use of an overcenter spring, however, causes undesirable noise when the door 28 is spring shut. To eliminate this noise and provide a smooth quiet operation of the door 28, the second end 74 of the hinge 70 includes a dampening member 80 and/or a bumper 81 can be provided on the sleeve. The particular type of dampening member 80 and bumper 81 can vary so long as it reduces or eliminates noise from the operation of the door 28.

To assemble the housing 10 to the body panel 14, the hinge enclosure 76 is first inserted through the aperture 12 from the outside of the body panel 14. The second end 26 of the sleeve 22 is then engaged within the aperture 12 as FIG. 3 illustrates.

Continued insertion of the sleeve 22 enables the flange 32 to engage with body panel 14 and the recess 20 which self-centers the sleeve 22 and housing 10 with respect to aperture 12 of the body panel 14. The fuel tank neck 16 is then inserted within the sleeve 22 with the cap 18 being connected to the neck 16 and the tether 62 to the housing 10.

Alternatively, the neck 16 can be in position with respect to the body panel 14 when the housing 10 is installed. Hinge enclosure 76 would then pass by the neck 16 with the sleeve 22 sliding over the neck 16 and the flange 32 engaging the body panel 14 as discussed above.

In either event, the housing 10 is self-centered with respect to the recess pocket 20 and, due to the configuration of the flange 32, helps self center the door and can adjust to changes or movement between the housing 10 and the body panel 14 during use. This is particularly advantageous at very low temperatures where contraction between these components can occur. Furthermore, at such low temperatures the small contact area provided by the bumps 46 or 48 prevent the door 28 from freezing shut against the housing 10.

Figure 13:
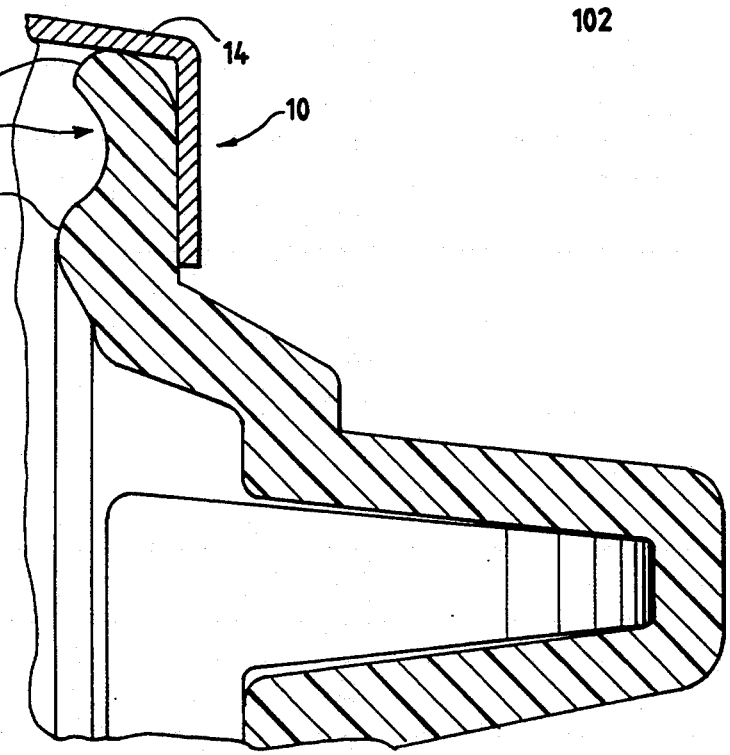
FIG. 13 is an enlarged cross-sectional view taken along line 13—13 of FIG. 12 illustrating the engagement between the body panel and the housing.

FIGS. 12 and 13 illustrate another embodiment of the housing 10 where similar elements are identified with the same reference numerals as in the previous embodiments. In this embodiment, the housing 10 and door 28 are substantially rectangular in shape.

In order to assist in aligning and centering the door 28 with respect to the housing 10, the door 28 includes a pair of depending tabs 100 for cooperative engagement with corresponding tab recesses 102 formed in the housing 10. Preferably, the pair of tabs 100 are positioned one each on opposite sides of an interior surface of the door 28 and the recesses 102 are formed in the flange 32.

The tabs 100 and recesses 102 are particularly effective in aligning the door 28 along its longitudinal axis or "front-to-back". Alignment of the rectangular door 28 is more difficult as the longitudinal length of the door 28 increases due primarily to the longer distance between the hinge 70 and the opposite end of the door 28.

Modifications and variations of the present invention are possible in light of the above teachings. It is therefore to be understood that within the scope of the appended claims the invention may be practiced other than specifically described.

We claim:

1. A fuel door housing for readily attaching a neck of a fuel tank with respect to an aperture defined within a body panel of a vehicle, comprising:

a hollow sleeve having a cross-sectional dimension which is less than that of said aperture, and first and second ends, said first end extending a predetermined distance away from said aperture within an interior portion of said body panel for connection with said fuel tank neck, and said second end extending a slight distance through said aperture, and defining therewith an annular space as a result of the difference between said cross-sectional dimensions of said sleeve and said aperture, to an exterior portion of said body panel;

a flange connected to said second end of said sleeve and having means defined thereon for resiliently and flexibly engaging said exterior portion of said body panel so as to move radially and axially with respect to said exterior portion of said body panel and thereby permit positional adjustment of said sleeve with respect to said aperture of said body panel, upon installation of said sleeve, as well as movement adjustments between said sleeve and said body panel that may occur during use of said vehicle; and a door hingedly connected to said housing for covering said aperture of said body panel as desired.

2. The housing as defined in claim 1 including a latch mechanism for latching said door with respect to said housing.

3. The housing as defined in claim 2 wherein said latch mechanism includes a first rigid finger connected to said door and a second flexible finger connected to said housing, said first and second fingers being positioned at corresponding positions about said door and said housing, respectively, for operable connection with respect to each other so as to latch and unlatch said door as desired.

4. The housing as defined in claim 1 wherein an inside surface of said door includes an inwardly projecting ridge thereon for cooperative engagement with a corresponding raised bead positioned about said flange, both said ridge and said bead providing increased strength and stability to said door and said flange, respectively, and for providing centering of said door with respect to said flange upon closing of said door.

5. The housing as defined in claim 1 including a tether connecting a fuel neck cap to at least one of said housing and said fuel tank neck to prevent misplacement of said cap after it is removed from said fuel tank neck.

6. The housing as defined in claim 5 wherein said door includes a hook for positioning of said tether and said cap during filling of the fuel tank.

7. The housing as defined in claim 1 wherein at least one of said door and said housing includes at least one raised bump thereon for reducing the contact area between said door and said housing when said door is closed and thereby reduce the possibility of said door becoming frozen to said housing at low temperatures.

8. The housing as defined in claim 1 wherein said door includes a dampening mechanism for providing smooth, quiet opening and closing of said door.

9. The housing as defined in claim 1 wherein said flange includes an outwardly projecting substantially flexible lip for providing said adjusting of said sleeve.

10. The housing as defined in claim 9 wherein said flange includes a raised bead for cooperative engagement with a ridge depending from an inside surface of said door, said bead and said ridge providing increased strength and stability to said flange and said door, respectively, and for centering said door with respect to said flange upon closing of said door.

11. The housing as defined in claim 1 wherein at least said housing, said flange and said door are substantially rectangular in shape.

12. The housing as defined in claim 11 including cooperative engagement members defined upon said door and said housing to assist in aligning and centering said door with respect to said housing.

13. The housing as set forth in claim 9, wherein:
a recess is provided upon said flexible lip for providing said resiliency and flexibility to said flange.

14. The housing as set forth in claim 13, wherein:
said recess is disposed upon an exterior surface of said flange.

15. The housing as set forth in claim 13, wherein:
said recess is disposed upon an interior surface of said flange.

16. The housing as set forth in claim 3, wherein:
said first rigid finger of said door comprises a shoulder portion, and a ridge member; and
said second flexible finger of said housing comprises a pair of spaced flanges for cooperation with said shoulder portion of said first rigid finger, and a slot defined between said spaced flanges for accommodating said ridge member of said first rigid finger.

17. The housing as set forth in claim 6, wherein:
said hook for said tether is disposed upon a hinge mechanism hingedly connecting said door to said housing.

18. The housing as set forth in claim 12, wherein said engagement members comprise:
a plurality of tabs integrally formed upon said door; and
a plurality of recesses provided within said housing for receiving said tabs formed upon said door.

* * * * *